Aug. 6, 1929.　　　A. C. HANSEN　　　1,723,508
AUTOMOBILE BUMPER AND BUMPER EXTENSION DEVICE
Filed April 1, 1929
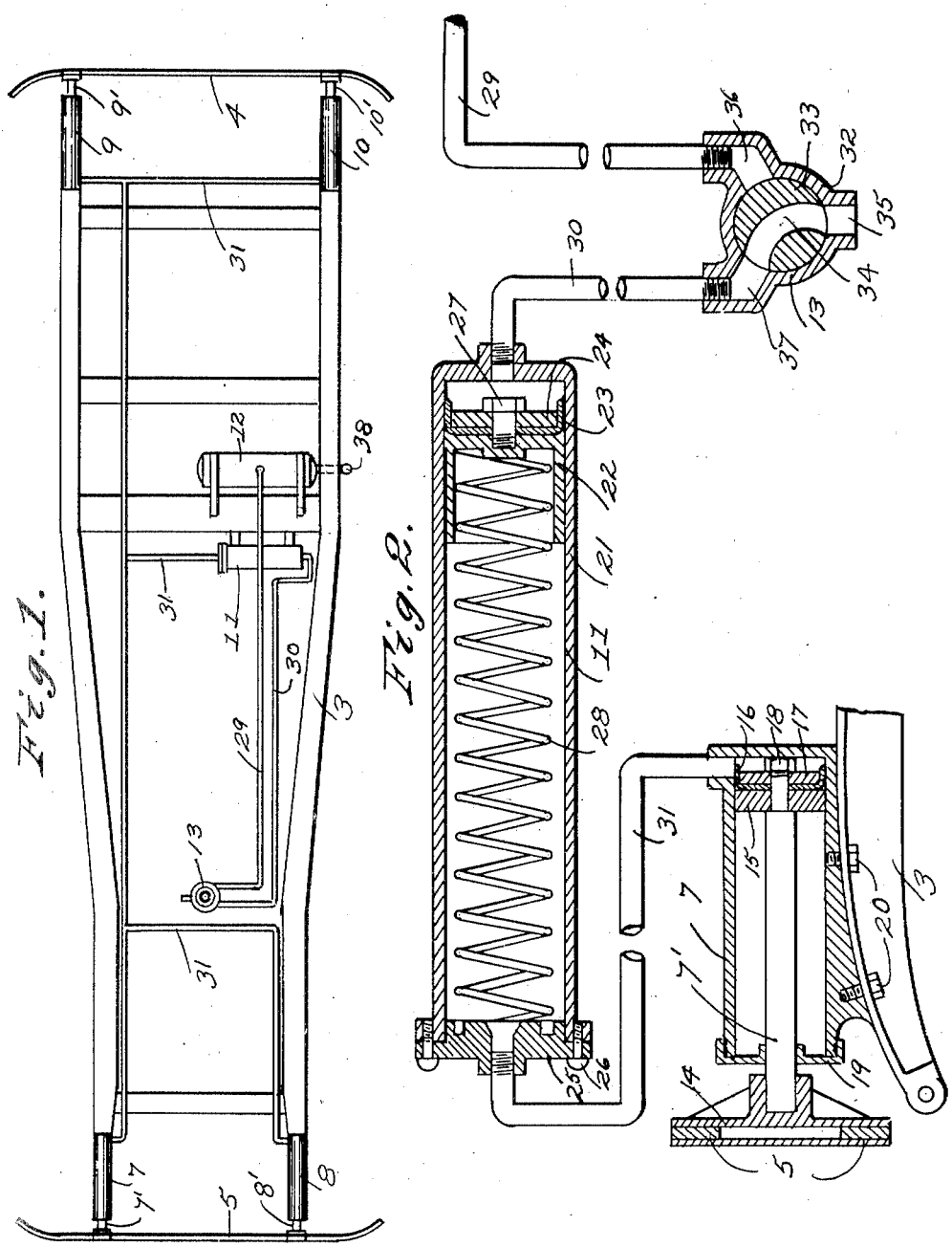
INVENTOR
ARTHUR C. HANSEN.
BY
Henry Molz
ATTORNEY Patented Aug. 6, 1929.

1,723,508

UNITED STATES PATENT OFFICE.

ARTHUR C. HANSEN, OF LOS ANGELES, CALIFORNIA, ASSIGNOR OF ONE-HALF TO HENRY C. SCHUMACHER, OF GLENDALE, CALIFORNIA.

AUTOMOBILE BUMPER AND BUMPER-EXTENSION DEVICE.

Application filed April 1, 1929. Serial No. 351,618.

My invention relates to an attachment of the class described for engagement to motor vehicles in particular, but which may just as readily be designed and constructed for attachment to other objects for which an article embodying the principles herein disclosed may be appropriate.

The principal object of my invention is to provide a bumper device that can be manufactured to incorporate a complete bumper assembly ready for attachment, or which may consist only of an extension device readily engageable with all standard automobile bumpers the market affords.

The chief purpose, however, is not to supply just another bumper in competition with the many already in use, but to enable these to serve a two-fold purpose, its principal adaptation other than for mere bumper purposes being to close up space both in front and behind the vehicle, assuming by way of explanation, that the device is attached front and rear as is customary on motor cars.

Mostly all States, if not all, have parking restrictions, prohibiting the parallel parking of cars closer than certain prescribed number of feet, generally two (2) feet, and thus legally estop the parking of cars so close to one another as to lock them and prevent ready exit from the curbing.

My extension device works on the principle of pneumatics, and is operated entirely from the dashboard or other location as may be preferred.

I attain this object by means of the device illustrated in the accompanying drawing, in which:—

Figure 1 is a top view of an automobile frame showing my device mounted thereon.

Figure 2 is a fragmentary view of my device in section, showing the master cylinder and the bumper cylinder in action.

Similar numerals refer to similar parts throughout the several views.

The number 3 represents an automobile frame, 4 and 5 the rear and front bumpers attached to the same, 7, 8, 9 and 10 are pneumatic cylinders housing pistons 7', 8', 9' and 10' operative therein. 11 is the master cylinder, 12 an air tank, 13 the air control valve, 14 the ends of the piston rods to which the bumper is attached, 15 the piston head, 16 the piston leather seated in a retainer 17 held in place on the piston rod by means of a nut 18, a cover 19 forming a forward bearing for said piston rod.

The cylinders are secured to the automobile frame by means of bolts 20. The master cylinder 11 is composed of a cylinder 21, a cup shaped piston member 22, cup leather 23, and a cup leather retainer 24, the whole held in place by bolt 27. A front head 25 secured to the cylinder by bolt members 26 serves to provide a seating means for a spring 28.

Extending from the tank 12, a pipe 29 connects with the control valve 13 and from said valve a pipe 30 leads to the master cylinder 11. Extending to all bumper cylinders, a pipe 31 leads from the master cylinder.

In construction, the control valve comprises a body portion 32, a plug 33 rotatably mounted therein, said plug having a passage 34 which in its operating position communicates with passages 35 and 37 as shown, or with 36 and 37 as is apparent, either to cause the air to be released from the air tank 12, enter the master cylinder 11 and thence pass to extend the pistons outwardly from the cylinders, or to cause the air in the master cylinder to be expelled by expansion of the spring 28, whereby the outwardly extending pistons are forced within their respective cylinders by the confined air therein. A valve 38 on the air tank 12 affords a ready means for refilling said tank when required.

Outstanding features of this device embody a conveniently operated pneumatic extension element, simple, dependable, and under positive control at all times. The drawing shows the device released, no air, other than that contained in the tank 12 remaining. The valve passage or port 35 being open, all compressed air previously contained in the circuit has been set free. A quarter turn on the valve disengages the passage 34 from the passage 35, brings it into direct contact with the passage 36 instead, thereby causing the air from the tank 12 to enter the master cylinder 11, the spring 28 therein contracting under the air pressure inserted which in turn permits the air to escape to the bumper cylinders and causes the pistons therein to be outwardly extended; a quarter turn of the valve again cutting off the air supply and releases the device as described, ready for the next application, In practice my device operates in the following manner. Having parked the car, the device is applied by means of the control valve at the dash, the actuated pistons under pneumatic pressure extending outwardly to the limit of their regulated length. If for any reason this is impossible, for instance when another car is parked in front or behind or in both places at the same time, and at a distance so close as to not permit this, the pistons will extend as far as they can, and when either or both cars blocking such full extension are removed, the pistons will automatically extend to their respective limits, and thus prevent any other car from being parked within the distance prohibited by law.

When the operator is ready to move the car, he simply releases the device, and thus automatically withdrawing the pistons and the attached bumper bars so that the car is free to be manipulated forward and backward within the space thereby gained to be readily driven from the spot.

I am aware that slight modifications may from time to time be made in the details of construction without departing, however, from the scope of the present invention as herein set forth, and as defined in the claims which are appended hereto.

Hence, I do not limit my present invention to the exact description of construction herein disclosed, but what I do claim as new and novel is:—

1. In a penumatic device of the class described, in combination, cylinders having piston members operative therewith, means for controlling the same, air retaining and conveying means in conjunction therewith, and whereby the air under said control means is freed to cause said piston members to become operative within said cylinders.

2. In a device of the class described, in combination, a cylinder, a spring mounted therein, air means for contracting said spring, connecting means from said cylinder to a plurality of separate and distinct cylinders each having a piston member operatively engageable therewith, and pneumatic means for operating said piston members, said means connected to said cylinder and acting in cooperative relation with said spring.

3. In a device of the class described, the combination with an air circuit and air control means, of a plurality of piston members engageable in separate cylinders and operative therewith, means for attaching said cylinders to motor vehicles, said piston members adaptable for attachment to automobile bumpers, and means whereby said piston members are extended from within said cylinders and withdrawn therein at will.

4. In a device of the class described, in combination, an air container connected to a cylinder, said cylinder containing a spring adapted to expand within said cylinder, means whereby said cylinder is connected to a plurality of separate cylinders each having a separate piston element disposed therein, said piston elements adapted for engagement with automobile bumpers, and valve control means for causing air to be released from aforesaid air container to outwardly extend said piston elements or to inwardly withdraw the same.

5. In a device of the class described capable of attachment to motor vehicles, in combination, an air circuit and air control means whereby the air is held in bounds or released at will, said air controlling means operatively connected to a cylinder having a spring disposed and adaptable to contract and expand therein, and with separate cylinders and piston members operatively engaged therein.

ARTHUR C. HANSEN.